July 3, 1934.  H. ERNST ET AL  1,965,224
VIBRATION DAMPENER FOR MACHINE TOOLS
Filed March 1, 1933  4 Sheets-Sheet 1

Inventor
HANS ERNST
MARIO E. MARTELLOTTI
By H. K. Parsons
Attorney

Patented July 3, 1934

1,965,224

UNITED STATES PATENT OFFICE 1,965,224

VIBRATION DAMPENER FOR MACHINE TOOLS

Hans Ernst and Mario E. Martellotti, Cincinnati, Ohio, assignors to The Cincinnati Milling Machine Company, Cincinnati, Ohio, a corporation of Ohio Application March 1, 1933, Serial No. 659,222

20 Claims. (Cl. 90—11)

This invention relates to milling machines and more particularly to mechanism for minimizing vibration or chatter therein.

One of the problems of modern industry is the minimizing of vibration in power actuated machinery because of its destructive effect thereon. In the past this problem has been solved in connection with some simple machines in which the whole machine vibrated substantially as a unit and at a given frequency because the source could be easily determined and simple means could be applied to correct for the same.

In machine tools and especially in milling machines, the problem is more difficult because instead of the whole machine vibrating as a unit, it may be considered as composed of a number of elastic systems, each of which has its own natural period of vibration and thus each system may vibrate either at its own natural frequency or at some modified frequency resulting from contact with the other systems, usually through contact between cutter and work. Furthermore, the cutting force created by opposition between cutter and work varies periodically in accordance with their instantaneous relative movement, which in itself is a function of the vibration of the various elastic systems.

It is therefore, difficult to determine the source and nature of vibration or chatter in such machines and thereby the corrective measures to be applied. This is best illustrated by the fact that at the beginning of a cut the machine may be functioning perfectly with a very minimum of vibration and yet a chatter will gradually develop as the cut proceeds until the machine is vibrating violently.

One of the principal objects of this invention, therefore, is to reduce or eliminate all harmful or objectionable vibration or chatter from a milling machine, irrespective of the frequency or the point at which, during the progress of the cut, the vibration or chatter may develop.

Another object of this invention is to provide a chatter eliminator for a milling machine which may be easily and quickly adjusted during the progress of a cut and thereby anticipate potential chatter.

A further object of this invention is to provide a secondary force system in a milling machine which will act in opposition to the disturbing force, such as a harmonic component of the cutting force, to counteract the vibrational effect thereof.

A further object is to provide an improved mechanism for damping or absorbing the vibration on machine tools.

Another object of this invention is to provide an hydraulic vibration dampener for machine tools.

Other objects and advantages of the present invention should be readily apparent by reference to the following specification considered in conjunction with the accompanying drawings illustrative of certain embodiments thereof, but it will be understood that any modifications may be made in the specific structural details thereof within the scope of the appended claims without departing from or exceeding the spirit of the invention.

Referring to the drawings in which like reference numerals indicate like or similar parts.

Figure 1:
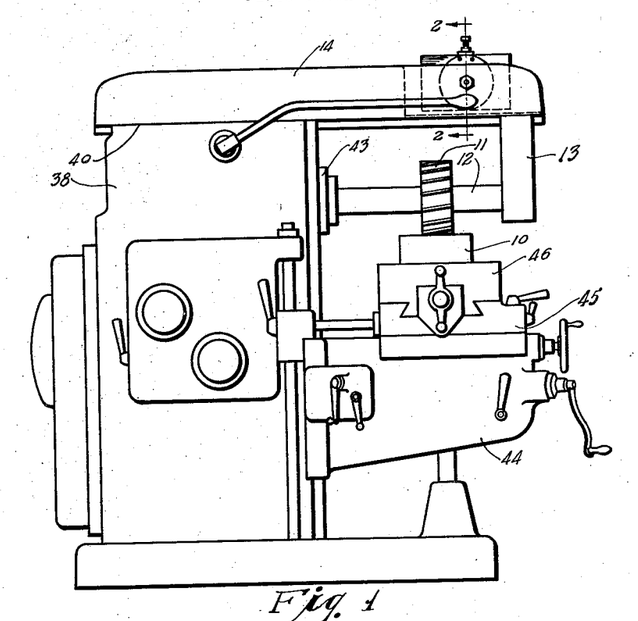
Figure 1 is an elevation of a machine tool embodying the principles of this invention.
Figures 3, 4, 5, 6, 7, 15:
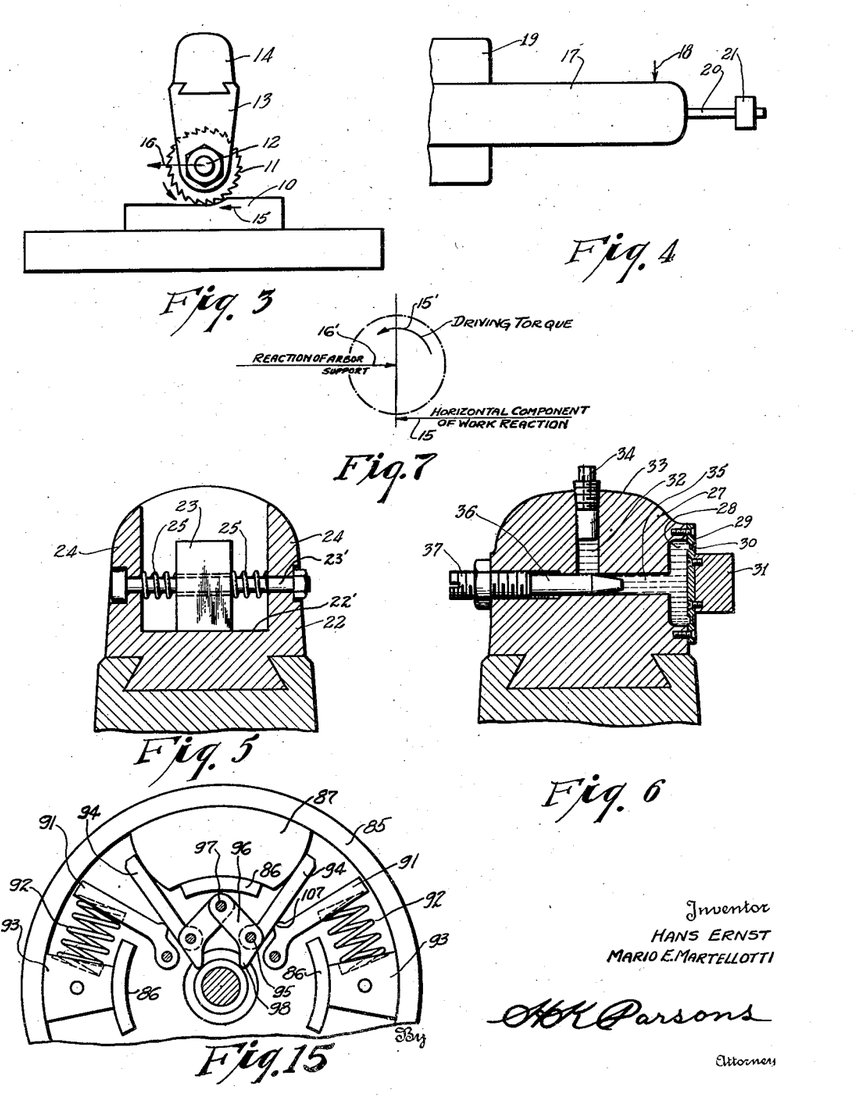
Figure 3 is a diagrammatic view showing the relationship of the force existing between cutter and work.
Figure 4 is a diagrammatic view showing one form of vibration opposer applied to a milling machine overarm.
Figure 5 is a sectional view showing one form of vibration eliminator having combined opposer and dampening means.
Figure 6 is a sectional view illustrating a fluid type of vibration dampener.
Figure 7 is a diagram of the forces acting on the cutter arbor.
Figure 15 is a section on the line 15—15 of Figure 11.

In order better to understand the problems involved in this invention, reference may be had to Figure 3 which shows diagrammatically a reciprocable work piece 10 and a rotary cutter 11. In a knee and column type milling machine, such as shown in Figure 1, the cutter is rotatably mounted on an arbor 12, and the arbor is supported against lateral movement by an arbor support 13 attached to an overarm 14. When the cutter comes in contact with the work, there are a number of forces created which act in various directions. One of these forces such as 15 is the horizontal component of the reaction of the work against the cutter tooth. This tends to stop the cutter rotation and thereby causes a certain amount of wind up in the power transmission to the cutter arbor. As the chip gradually separates, this force will lessen, permitting a certain amount of unwinding to take place. Thus this force is periodic in nature and the winding and unwinding constitutes a certain form of oscillatory motion or vibration; while the transmission, cutter arbor, and cutter all may be considered as constituting one elastic system having a certain natural frequency, which is susceptible to or may be influenced by this vibration.

The force 15 produces a couple which opposes the driving torque 15' (Figure 7) and thus is transmitted to the cutter arbor where it acts additionally to cause a bodily displacement of the arbor laterally in direction of arrow 16, which in turn is opposed by the reaction 16' of the arbor support 13, the overarm 14, and the column 19. Thus the overarm, its supporting column, the arbor support, and the cutter arbor may be considered as the cutter supporting structure for counteracting this lateral force, and also as constituting a second elastic system which will have its own natural period of vibration depending chiefly upon the mass, resilience and moment arm of the parts projecting from the column.

In order to effect metal removal there must, of course, be a relative bodily movement between cutter and work and in the ordinary milling machine this is effected by providing a power feed mechanism for the work support which effects bodily movement thereof past the cutter. The reaction between the cutter and work naturally causes a wind-up in the feed transmission similar to the spindle transmission, as well as a possible lateral movement of the entire work supporting structure. As the cutting force varies during the progress of the cut, in accordance with the instantaneous relative movement between cutter and work, there will be a certain amount of wind-up and unwind of the feed transmission, as well as a certain amount of lateral movement in the work support, and thus the feed transmission and work support may be considered as comprising respectively a third and fourth elastic system.

It will thus be seen that the machine may be considered as being divided into or composed of a number of elastic systems, each of which has its own natural frequency, that is, a frequency at which the system would vibrate if acted upon once by an instantaneous force and then permitted to move freely. All of these systems contact at the point of cutting and as a result of the periodic nature of the cutting force vibrations will be induced in these various systems.

From the foregoing, it is evident that the first and second elastic systems act in opposition to the third and fourth, thus it will be seen that there are in reality two major systems opposing one another at the point of contact between the cutter and work.

The manner in which the cutting force causes vibration in these major systems will now be considered. The cutter of a milling machine is provided with a number of equally spaced teeth and is rotated at a definite number of revolutions per minute which will therefore upon contact with a work piece impart a force thereto which will vary periodically with the passage of each successive tooth. The instantaneous values of this force may be plotted against time to form an instantaneous force curve, the ascending portions thereof representing an increase in pressure as the tooth forms the chip, while the descending portions represent the decrease in pressure as the chip is finally separated and the tooth passes out of the work. The number of these periodic variations or impulses in a unit of time, will obviously vary in accordance with the number of teeth in the cutter and its speed of rotation.

The instantaneous force curve is thus a periodic function of time, and consequently may be resolved into a fundamental and higher harmonics, and thus be represented by the well-known Fourier series:

$$Y = a + b \cos x + c \cos 2x + d \cos 3x + \\ b' \sin x + c' \sin 2x + d' \sin 3x +$$

where the coefficients $b$, $c$, $d$, etc., and $b'$, $c'$, $d'$, etc., determine the amplitudes of the component harmonics of the force curve, while the angles $x$, $2x$, $3x$, etc., determine the order of these harmonics. Thus each harmonic may be separately plotted as a function of time to show its frequency and amplitude.

In practice it is found that the instantaneous force curve is of a very unsymmetrical and irregular shape, and thus frequently contains high order harmonics of large amplitude. If, in a given case, there exists a harmonic of appreciable amplitude which substantially corresponds in frequency to the natural frequency of any of the elastic systems, a violent vibration of that system will gradually develop due to the fact that this harmonic acts in timed relation to the natural swing of the vibrating system, and thereby increases the amplitude thereof with each successive force impulse. This increase in amplitude reacts to change the contour of the force curve itself so as to increase the amplitude of the particular harmonic which is exciting the vibration. Increasing the amplitude of the particular harmonic will in turn increase its effect on the vibrating system, and thus each in turn increases the other and sets up a self-sustaining circle of effects.

It is of course apparent that although one system may be affected by a particular harmonic of appreciable amplitude, there may not be any harmonic which closely approximates the natural frequency of the other system, and therefore no violent vibration from this source would occur. However, a violent vibrating condition in one system has its effect upon the opposing system, due to their common point of contact, and thus imparts a similar vibration to the latter system. Accordingly, both systems will vibrate at substantially the same frequency, and this vibration will be perpetuated by the resulting alternate impact and rebound between cutter and work.

It therefore follows that if violent vibration is to be eliminated, means must be provided for controlling the amplitude of any vibration that may be set up. A vibration eliminator has therefore been proposed by this invention to function in such a manner as to reduce to a negligible value the amplitude of the vibrational movement and thereby reduce vibration of the machine. Such an eliminator may be arranged to act in tuned opposition to the vibration of the excited system, that is, at the same frequency and, to be most effective, in opposite phased relation thereto.

Such an eliminator or tuned opposer may be placed on either or both major systems or on either sub-system of the major system but preferably on the one which is usually subject to more violent vibration. In a milling machine, conditions differ so widely that neither system can be said under all conditions to be more subject to vibration than the other. However, for many classes of work it is preferable that the device be mounted on the cutter supporting system, the most convenient portion of which may be the over-arm. This is for the reason that in the knee and column type machine, the overarm is upon the top of the column, and therefore the torsional movement of the column at the top will be of greater amplitude for a given disturbing force than at any lower point and therefore the end of the overarm will move through a greater distance for a given force than will the end of the work supporting structure for instance. On the other hand, for other classes of work, it may be desirable to mount the device on the knee, or any other member of the work supporting and feed driving system. In other cases, again, it may be desirable to mount the device upon the cutter driving system. Since the opposing effect of the eliminator must be dependent upon the movement which is imparted thereto by the excited member, it will be apparent that the greater the movement of the excited member the smaller the size and weight of the opposing member can be in order to produce the same effect.

Although the tuned opposer may be mounted on the overarm while the work supporting structure is the principal vibrating system, the tuned opposer will act to eliminate vibration of the latter system due to the fact that it limits the swinging movement of the overarm thereby preventing the building up of a large and unrestrained oscillation in the work supporting structure.

These tuned opposers may take various forms without departing from the basic principles of this invention, the variations in form depending upon practical considerations such as the type of system to which it is to be applied. For purposes of explanation, a simple form of tuned opposer has first been represented, and is shown diagrammatically in Figure 4, in which the member 17 may be assumed to represent a machine tool element such as the overarm of a milling machine which is free to move at its natural frequency about a center of oscillation upon receiving a single instantaneous impulse from a disturbing force. If such an impulse is assumed to act in the direction of the arrow 18, the free end of the member 17 will move back and forth at its natural frequency which frequency will depend upon its mass and rigidity. The center of oscillation of the overarm is normally at the neutral axis of the column. If instead of a single instantaneous impulse, a periodic impulse having a frequency equal to the natural frequency of the member 17 acts upon it, the parts will be in resonance causing the amplitude to increase to a large value. This increase will extend theoretically to infinity, but in practice is limited to some maximum value depending upon the energy dissipated per cycle by the internal damping in the system.

To counteract this great increase in amplitude, an opposing member 20 may be attached to the end of the member 17 and irrespective of its own natural frequency will be given a forced vibration, depending upon the vibration of the member 17. If the member 20 is absolutely rigid, it will move absolutely in unison with the member 17, the two moving as one member. On the other hand, if the member 20 is resilient, or in other words has a somewhat flexible connection with the member 17, its inertia will cause it to bend or deform first, and thereby to lag behind the movement of the supporting member, or in other words to be out of phase with it. This difference in phase will depend largely upon the rigidity and mass of the opposer 20.

If now the mass of the opposer is changed by adding an inertia member or weight 21 thereto, its natural frequency will be changed causing a corresponding change in phase relation between member 20 and the overarm. By making the weight adjustable it is possible to vary or tune the natural frequency of this auxiliary force system so as to make it equal to the frequency of oscillation of the disturbing force in which case the phase relation between the motions of members 17 and 20 would automatically become 90 degrees as shown hereafter. The weight 21 will now be in a position corresponding to that which produces a condition of resonance in the opposer 20 with respect to the disturbing force.

Attention is invited to the fact that the opposing unit is in effect a normally static member which tends to remain at rest until moved and which will tend to keep moving in the same direction once it is set in motion in accordance with physical laws. Since the motion of this unit is out of phase with that of the support 17, it makes possible the utilization of its inertia to oppose the motion of member 17 and thereby reduce the amplitude of oscillatory movement of the overarm.

Further adjustment of the weight 21 away from the supporting member 17 to a point just beyond the position corresponding to resonance will cause the ratio of the impressed frequency to the natural frequency to be increased to a value slightly greater than one. This will increase the phase relation to a value almost equal to 180 degrees. This is best understood by referring to Figure 10 in which the curve 68 represents the relation between phase angle and the ratio of impressed frequency to natural frequency. When the ratio is zero, the phase angle is zero but as the ratio approaches unity, a lag or change in phase develops which increases rapidly to 90 degrees. As the frequency of the disturbing force or impressed frequency gradually becomes greater than the natural frequency of the opposer unit, the ratio becomes greater than one and the phase relation approaches 180 degrees as a limit. The point of intersection between the 90 degree abscissa and the ordinate representing unity ratio is the point of resonance. It will be noted that because of the rapid rise of the curve 68 at this juncture, a slight change in frequency ratio causes a marked variation in phase.

Figure 8:
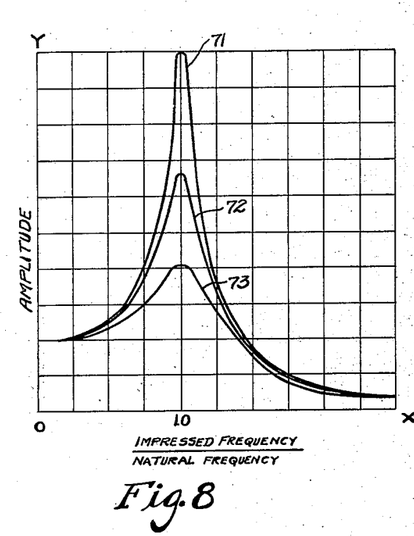
Figures 8 and 9 are graphs illustrating the effect of different amounts of dampening on the amplitude of movement at the resonance point.

It will be noted that the device shown in Figure 4 utilized a force which acted in opposition to the impressed or disturbing force to neutralize the same. In the graph of Figure 8 the ratio of impressed frequency to natural frequency is plotted along the abscissa or X-axis and the ratio of the instantaneous deflection, or amplitude of movement, to the static deflection is plotted along the Y-axis. The point 1.0 represents the condition of resonance at which time the impressed frequency is equal to the natural frequency and corresponds to the resonance ordinate 1.0 in Figure 10. If no damping is present the value of the deflection ratio will extend upward to infinity as an asymptote to the ordinate 1.0. A small amount of internal damping, however, is always present in any device, due to molecular friction, and the effect of various amounts of internal damping on the amplitude of movement is shown by curves 71, 72 and 73. Also an increase in damping tends to flatten out the curve 68 in Figure 10, as shown by the curves 69 and 70. From the sharp peak of curve 71 it will be seen that any opposition system, such as the device shown in Figure 4, must be tuned within very small limits relative to ordinate 1.0 to insure effective opposition because the curve drops so sharply on either side of the resonance point that variations beyond these limits renders the tuned opposition practically useless. Attention is invited to the fact that it is the adjustment of the tuning member such as the weight 21 that changes the ratio plotted along the X-axis and therefore a change in this ratio may be said to correspond to a change in tuning.

As previously mentioned, a wide range of disturbing frequencies develop in a milling machine due to the complicated nature of the machine structure, and on this account the frequency that is causing the disturbance may change from time to time and thereby necessitate constant attention on the part of the operator. In order to eliminate first one and then another of these disturbing frequencies as they become dominant, it is desirable that means be provided to increase the effective range of a tuned opposer and thereby eliminate the necessity of such constant attention. The adding of damping to a tuned opposer reduces the amplitude of movement at the point of resonance as shown by curves 72 and 73. The real effect of this is shown more clearly, however, in Figure 9 wherein the curves 71, 72 and 73 are re-plotted respectively as 71', 72' and 73' and as percentages of the maximum amplitude produced at the point of resonance with each condition of damping. In this figure, it is assumed that the top of each curve 71, 72 and 73 shown in Figure 8 represents 100% movement and these curves are superimposed upon one another to show that variations from perfect tuning, corresponding to departures from the ordinate 1.0 in either direction along the X-axis, are less detrimental for the greater amounts of damping and that the device will be effective over a greater range of frequencies if a certain amount of damping is provided in conjunction with a tuned opposer. For instance, if the point of tuning is shifted to the ordinate T—T, it will be seen that the amplitude of movement is still 80% of the maximum as represented by the curve 73' while with less damping as represented by the curve 72', the percent of movement drops to approximately 70%, while with a small amount of damping as represented by the curve 71', the percentage is only about 60% of the maximum. It will thus be seen that an increase in damping produces a condition wherein the point of tuning may be noncoincident with the point of resonance and still be effective over a substantial range without a great loss in efficiency.

Figure 9:
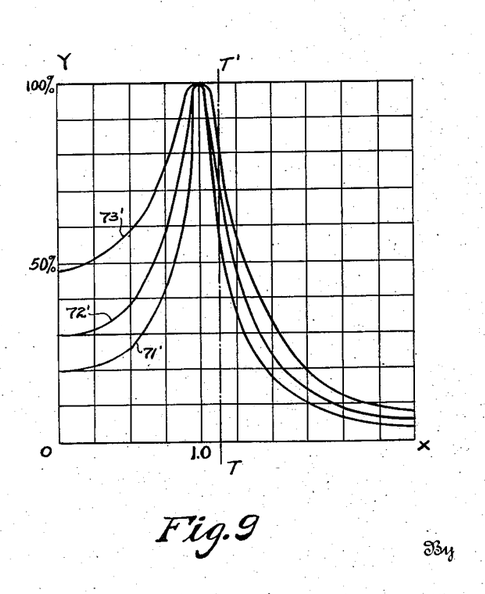

The provision of artificial damping in conjunction with a tuned opposer may be accomplished in various ways. The two may be combined in substantially a single unit or they may be separately provided at spaced points but in such a manner that their combined effect is still the same. A simple example of combining the two in a single unit is illustrated in Figure 5 in which the weight 23 is mounted upon the free end of an over-arm 24 and guided by a rod 23' upon which are mounted springs 25 between the sides of the weight and the sides of the over-arm. The effect of these springs is similar to the resilience of the member 20 in that a certain potential energy is stored in the springs during movement of the weight by inertia in one direction and then released at the proper time to effect movement of the weight in the opposite direction. This construction constitutes a vibrator or opposer similar in action to that shown in Figure 4. If the inertia member or weight 23 is also permitted to rest upon the overarm, an additional force will be brought into play upon vibration of the parts, that is, the frictional force between the weight 23 and the supporting surface 22' of the overarm. This frictional force acts to damp the relative movement between the weight 23 and the overarm which has the effect as shown in Figures 8 and 9 of decreasing amplitude but increasing the effective range.

Figures 11, 12, 13, 14:
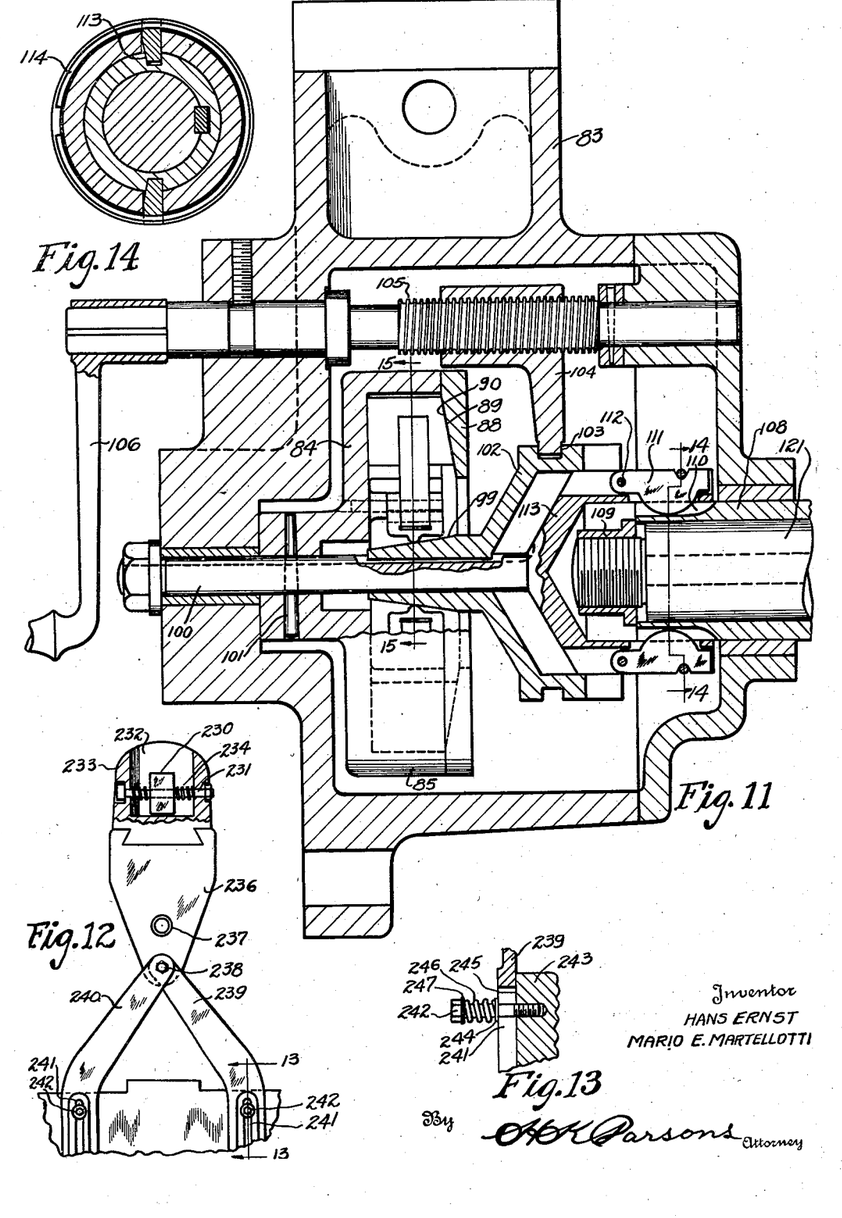
Figure 11 is a sectional view through a vibration eliminator suitable for attachment to a rotary member.
Figure 12 is an elevation partly in section showing the opposing and dampening means at separated points.
Figure 13 is a section on the line 13—13 of Figure 12.
Figure 14 is a section on the line 14—14 of Figure 11.

An embodiment under the other condition wherein the opposer and the dampener are provided at spaced points is illustrated in Figures 12 and 13. In this case the weight 230 is supported on a rod 231 in a cavity 232 formed in the upper part of the overarm 233 and a spring 234 is interposed between opposite sides of the weight and the sides of said cavity. The weight is mounted for free movement except for opposition from the springs. This constitutes an opposer which has only slight internal damping of its own. This opposer is shown as applied to the elastic system, previously referred to as the cutter supporting structure, which includes the overarm, the pendant 236, which, in turn, journals at 237 the outboard end of the cutter arbor. The lower end of the pendant has a threaded aperture for receiving bolt 238 which secures brace arms 239 and 240 thereto. These brace arms have slots 241 formed at one end thereof for receiving bolts 242 which may be threaded in an adjacent part of the machine, such as 243.

As shown in Figure 13, the bolt is threaded into the member 243 and provided with a washer 244 between which and the boss 245 on the member 243, the arm 239 is held in place. A spring 246 is mounted on the bolt between the washer 244 and the shoulder 247 of the head so that upon rotation of the bolt the spring 246 may be compressed to increase the frictional resistance between the side of the brace 239 and the face of the washer 244 and the boss 245. The frictional resistance developed by this means corresponds in effect to the frictional resistance between the weight 23 and the overarm as shown in Figure 5, but has the additional advantage that it may be adjusted. From this it will be seen that tuned opposition is applied at one point, and the damping means is applied at a point spaced therefrom but in rigid connection therewith so that the two operate upon the one member, in this case the cutter arbor. The damping means thus acts in coordination with the tuned opposer to produce the combined result such as accomplished by the single unit shown in Figure 5, but due to the fact that the bolts are adjustable it is possible to vary the amount of energy that is absorbed or dissipated by the damping means.

Another method of absorbing the vibrational energy and thus minimizing the movement effected thereby is illustrated in Figure 6 in which the overarm 27 is provided in one face with a depression 28 having a cover plate 29 inclosing the same to form a reservoir. This plate may be of a flexible nature, or if not it may be sufficiently weakened as at 30 to give it a resilient quality. A weight or mass 31 is attached to the outside of the plate. Due to the resilience of the member 29 which causes it to act as a vibrator or opposer it will be seen that the weight 31 will tend to lag behind the movement of the member 27 depending upon the extent of the resiliency of its support. In this case the damping or ability to absorb vibrational energy, is increased over that present in the plate by providing a reservoir 32 in the interior of the overarm which may be filled with liquid by means of a channel 33 having a plug 34 in the upper end. A horizontal channel 35 intersects the lower end of this reservoir to connect it to the depression 28. A valve member 36 is reciprocably mounted at the intersection to restrict the passage therebetween, and thereby vary the resistance to the flow of the liquid. This valve may be adjusted by means of the threaded member 37. If the valve 36 is wide open, there will be a free flow of liquid between the reservoir and the depression. In this instance, no work will be done on the liquid and there will be substantially no damping. If, however, the passage is restricted by adjustment of the screw 37, energy will be utilized in deforming the plate and the liquid contained in the reservoir, thus forcing the liquid through the restricted passage, and thereby introducing any desired degree of damping.

From the foregoing illustrations it will now be evident that a vibration eliminator should preferably have the following characteristics; that is, it should be a tuned opposer adapted to act in opposition to the disturbing force. It should be adjustable so that its natural frequency may be tuned to the frequency of the disturbing force thus providing maximum opposition thereto. It should have sufficient damping so that the previous adjustment once made will be effective over a sufficient range that frequent adjustment will not be necessary. The damping means should also be adjustable because it not only makes possible the result just recited but it also has the ability to absorb energy and thus reduce the work to be performed by the opposer.

A device having the above characteristics is illustrated more particularly in Figures 1, 2, 16 and 17. The reference numeral 38 represents the column of a milling machine having an overarm 14 reciprocably mounted in guideways 40 formed on the top of the column. A pendant 13 is adjustably mounted on the end of the overarm for journaling the outboard end of a cutter arbor 12 which is attached at the other end to a cutter spindle 43 journaled in the upper part of the column. A work support organization comprising a knee 44, a saddle 45 movable transversely of the knee, and a table 46 reciprocable transversely of the saddle is mounted on the column for movement or adjustment in a plurality of directions relative to the cutter 11 carried by the arbor. Suitable power means may be provided in the column for effecting rotation of the arbor and cutter carried thereby, as well as power translation of the work support and work carried thereby, transversely of the cutter.

Figure 2:
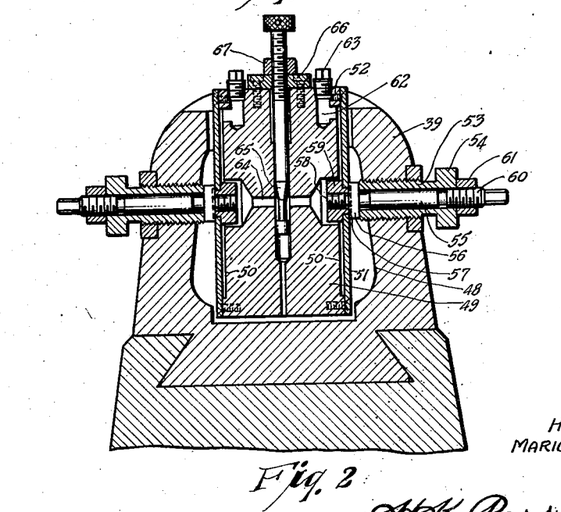
Figure 2 is a section on the line 2—2 of Figure 1.

In this construction the vibration eliminator 80 may be applied to the overarm and for this purpose the upper part of the overarm has been provided with an elongated slot 48 in which is suspended the vibration eliminator, comprising the inertia member or block 49 which in the present instance is rectangular in shape. The side faces of this member are provided with circular depressions 50, the depth of which is relatively small. Circular members 51 are applied to the sides of block 49, in the form of cover plates, and held in position by fastening means, such as the screws 52. The members 51 may be made of suitable resilient material and form the means by which the member 49 is suspended in the opening of the overarm. A bushing 53 is threaded in each side wall of the overarm and provided with an adjusting knob 54. A supporting rod 55 is reciprocably mounted in the bushing having an enlarged head 56 which is cup-shaped at 57, the periphery of the cup engaging the face of the member 51. A stud 58 integral with the rod projects through the center of the cover plate 51 for receiving a locking nut 59 threaded on the lug and engaging the opposite face of the plate 51. By tightening the locking nut, the member 51 and rod 55 may be secured together as a single unit. The outer end of the rod 55 is threaded at 60 to receive the locking nut 61 which secures the rod to the bushing. By adjusting the bushings through rotation of knobs 54, it is apparent that the position of the member 49 may be adjusted centrally of the opening and the plates 51 adjusted to a parallel relation with one another, held in that position. The result is that the center portion of plates 51 between nuts 59 and heads 56 are rigidly held with the overarm and move therewith.

The suspended structure consisting of the weight 49 and the plates 51 constitutes a tuned opposer or vibrator. Due to the resilience of the plates 51, it is apparent that upon vibration of the overarm, the weight 49 will lag, or in other words be out of phase with it to the extent of the resiliency of these plates. Hydraulic dampening means have also been provided somewhat similar to that shown in Figs. 6. To this end the depressions 50 are filled with a liquid by means of the channels 62 formed in the top of the member 49 having removable caps 63. It will be seen that each depression is provided with its own filling inlet thereby insuring that no air will be trapped in either depression. A horizontal channel 64 connects the depression on one side with the depression on the other side and has mounted therein a reciprocable valve member 65. This valve member extends through the top of the block 49 where it is threaded in a bore 66 and provided with a lock nut 67 for retaining it in any adjusted position. Vertical movement of the plunger 65 will vary the restriction in the channel 64 and thereby determine the rate of flow from one depression to the other and thereby determine the amount of energy absorbed by the deformation of one of the plates and the resultant deformation and transfer of the fluid body in the adjacent reservoir.

Figures 10, 17:
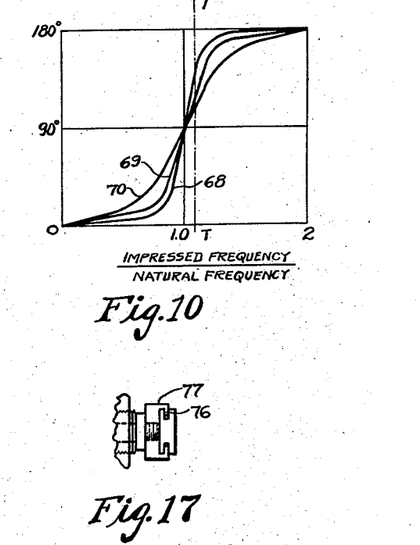
Figure 10 is a graph illustrating the effect of dampening in the phase relation between disturbing force and disturbed member.
Figure 17 is a section on the line 17—17 of Figure 16.
Figure 16:
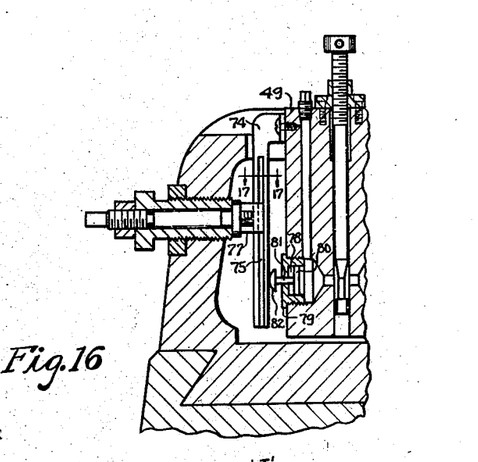
Figure 16 is a sectional view showing a modified form of the construction shown in Figure 2.

In order to provide for adjusting the dampener, and thus changing the shape of the resonance curve, Figures 8 and 9, the spring plates may be replaced by resilient arms 74 as shown in Figure 16. These arms may be attached to the top of the member 49 as shown in the drawings, so as to depend therefrom and make it possible to change the effective length thereof. As shown in Figure 17, these arms may be provided with longitudinal grooves 75 in opposite sides thereof for receiving the inturned flanges 76 of the connecting member 77. This member has a tapped hole for receiving the threaded end 58 of bolt 55 whereby upon rotation of the bolt the flanges 76 will grip the sides of the groove and lock the connector to the arm 74. The recesses in the opposite sides of the block 49 may be in the form of cylinders 78 formed in the member 79 threaded into the side of the block. A piston 80 is reciprocably mounted in the cylinder having a piston rod 81 which has an enlarged head 82 for bearing against the side of the arm 74. The cylinders may be inter-connected by a passage 64 having a valve 65 therein as previously described. By varying the effective length of the arm 74 the natural frequency of the weight 49 and attached parts may be varied which makes it possible to tune the natural frequency of this system into resonance with the frequency of a disturbing force. It will be noted that, in this type of eliminator, artificial damping is obtained by the resistance of the valve 65 to the flow of liquid past it, which produces the same effect as the frictional damping obtained by the structure shown in Figure 5.

In some instances it may be desirable to apply the eliminator to a rotary member such as the arbor 12 in Figure 1 in which case the eliminator must assume a different form but the principles remain the same. Such an eliminator is illustrated in Figures 11, 14 and 15 and is mounted in a support member 83 which may take the general form of a pendant which may be removably attached to the overarm of a milling machine, and also detachably connected to the end of the cutter arbor. The eliminator itself comprises a rotary member 84 having a peripheral flange 85 which thereby forms a cavity in one face thereof. As shown in Figure 15, additional ribs 86 are formed integral with the member 84 and in concentric relation to the flange 85. A weight 87 is mounted between one of these ribs and the flange so that upon rotation of the flywheel 84 the weight 87 will be forced by centrifugal force against the inside of the flange 85. A cover plate 88 incloses the cavity and has a tapered inside surface 89 which corresponds to a complementary tapered surface 90 formed on one face of the weight 87. Upon development of sufficient centrifugal force it will be seen that a large amount of frictional resistance will be created between the weight and the fly-wheel tending to cause the two to rotate together. This frictional resistance corresponds to the frictional resistance existing between the weight 23 and the surface 22' as explained in connection with Figure 5.

Pivoted vibrators 91 are provided for maintaining the weight 87 in a substantially central position between them and are connected to the weight by a link mechanism, the effective arm of which may be varied. Springs 92 are interposed between the vibrators and fixed blocks 93 for absorbing and releasing energy in the same manner as the springs 25 illustrated in Figure 5. The linkage mechanism comprises a pair of arms 94 which are pivoted at 95 to individual links 96, the links being pivotally mounted on a common fixed pin 97. Each link has a rounded nose 98 which bears on a circular tapered adjusting member 99 which is slidably mounted on a shaft 100 to which the member 84 is also fastened by means of a pin 101. The tapered member 99 has an enlarged disc 102 in the periphery of which is formed a groove 103 for receiving a shifter member 104. The shifter member has a tapped hole for receiving the screw 105 which is journaled at opposite ends in the support 83. A detachable handle 106 may be utilized for rotating the screw 105 and thereby effecting axial adjustment of the tapered member 99 which in turn varies the effective length of the arms 94 relative to the contact bosses 107 formed on the vibrators 91. This effects the same result as explained in connection with the shifting of the weight 21 in Figure 4.

From the foregoing it will now be seen that the principle of operation of this device is the same as in the previous structures in that vibrators have been provided which act on a movable weight; that the frequency of the vibrators may be adjusted so as to coincide with a disturbing frequency; and that damping means have been provided in the form of frictional resistance between the weight 87 and the cover plate 88. This structure may be detachably connected to any rotary member and in the form shown is operatively connected to an arbor 12' having a spacing collar 108 secured to the end thereof by the usual nut 109. This collar may have keyways 110 formed in opposite sides thereof for receiving the keys 111 which are pivotally connected at 112 to a flange portion 113 formed integral with the shaft 100. In order that lost motion may be prevented between the arbor and the rotary member 84 and thus insure response of the member 84 to any vibrations that may be set up in the arbor, the keys 111 are tapered on one side at 113 as shown in Figure 14 to insure a positive connection with the collar 108. A split circular ring 114 surrounds the keys so that upon application of the device to the arbor the keys will be firmly pressed into the slots 113. If the keys and slots are not in alignment upon assembly of the device they are free to pivot until the arbor and collar have been rotated sufficiently to bring the slots into alignment. From this it will be seen that no attention is required on the part of the operator as to the relative position of the keys and slots when assembling the device to a rotary member.

A vibration eliminator has been provided that is applicable to machine tools such as planing machines, milling machines and the like having relatively movable tool and work supports which may assume various forms for practical reasons so that the same may be attached to different types of members but which in any case has the same functions and characteristics. That is, it comprises a vibrator or vibrators which are connected to the machine tool member by a means which is in effect deformable to permit movement of the vibrators in one direction; but which has sufficient resilience to effect return movement thereof, and means to adjust the natural frequency of the vibrators so that they will substantially coincide with the frequency of the disturbing force. In consequence, means have been provided for changing the phase relation between the motion of the vibrator and its supporting member so that the vibrator will act in opposition to the disturbing force and thereby reduce the amplitude of the vibratory motion. Adjustable damping means have also been provided which have the effect as previously explained, of broadening the effective range of the device so that frequent manual adjustments are not necessary when the disturbing frequency varies slightly above or below the natural frequency of the vibratory system.

What is claimed is:

1. In a machine tool the combination with a rotating cutter, a cutter support and a work support relatively movable to feed a work piece into engagement with the cutter, of means to stabilize the position of the cutter axis during the feeding movement including an inertia member carried by the cutter support, means connecting the member to the support for transmitting vibration of the support to the member, and means for causing said member to store part of the kinetic energy of each vibrational impulse transmitted thereto for subsequent relase at the initiation of the next impulse to oppose the same, said opposition being retransmitted by said connecting means to the cutter support.

2. A machine tool having a cutter, a cutter support, a work support relatively movable for feeding a work piece into opposition with the cutter, means to stabilize the relative position of cutter and work during the feeding operation including an inertia member mounted on one of said supports, and deformable means coupling the member to the support whereby vibrational movement of the support will cause a delayed movement of the member, said deformable means permitting continued movement of the member in the same direction after reversal in the direction of the vibratory movement of the support, whereby the opposed inertias of the oppositely moving parts will effect said stabilization.

3. A machine tool having a reciprocable work support, a cutting tool positioned to effect stock removal from work fed relative thereto, a support for the cutting tool, means to prevent relative vibrational displacement between tool and work during cutting comprising an inertia mass carried by one of said supports, deformable connecting means coupling the support member to the mass whereby part of the vibratory energy of the member will be dissipated in effecting deformation of the connecting means, said deforming operation delaying initiation of mass movement whereby the direction of part of said mass movement will be opposite to the direction of support movement thereby reducing the amplitude of said displacement.

4. A machine tool having a rotatable cutter, an arbor for supporting the cutter, a work support for feeding a work piece into opposition with the cutter, a support for said arbor, means to stabilize the position of the cutter during the feeding movement including an inertia member mounted on the arbor support, means coupling the member to the arbor support whereby vibration of the arbor support at a given frequency will induce vibration in the inertia member at the same frequency, said coupling means being yieldable to change the phase relationship between the vibratory motions of the two members and thus cause one member to oppose the movement of the other.

5. A machine tool having a reciprocable work supporting member, a multiple toothed cutter positioned to effect stock removal from work fed relative thereto by said member, an arbor support, an arbor journaled in the support for supporting and rotating said cutter to effect successive engagement of the cutter teeth with the work whereby a periodic cutting force composed of a number of harmonics will be created, a vibration eliminator carried by the arbor support, said eliminator including a vibrator, means to adjust the natural frequency of the vibrator into resonance with the dominant harmonic of said cutting force, and means to change the phase of the resultant motions of the cutter and vibrator whereby said vibrator will oppose movement of the arbor support by the cutting force.

6. A machine tool having a rotatable cutter, an arbor for supporting the cutter, a work support for feeding a work piece into opposition with the cutter, a support for said arbor, means to stabilize the position of the cutter during feeding of the work including a vibration dampener mounted on the arbor support, yieldable means coupling the dampener to the arbor support whereby vibration at a given frequency of the arbor support will induce vibration at the same frequency in the dampener, and means to vary the adjustment of said yieldable means to change the phase relationship between the motions of the two members.

7. A machine tool having a rotatable cutter, an arbor for supporting the cutter, an arbor support, a work support movable in opposition to the cutter to feed a work piece relative thereto, means to stabilize the position of the cutter during feeding of the work including a tuned opposer mounted on the arbor support, yieldable means coupling the tuned opposer to the arbor support whereby vibration of the support will cause a delayed movement in the opposer, and means to tune the motion of said opposer into opposite phase relation to the vibrational movement of the arbor support whereby one will act continuously in opposition to the direction of movement of the other.

8. A machine tool having a cutter support, a cutter rotatably journaled thereon, a work support adapted to move in opposition to the cutter to feed a work piece relative thereto, means to eliminate vibration from said supports including a weight associated with one support so that vibration thereof will induce oscillation of the weight, an arm for supporting and connecting the weight to the support, said arm being flexible whereby the movements of the support and weight will be out of phase, and means to adjust the effective length of said arm to vary the phase relationship between the motion of the weight and the motion of the support.

9. A machine tool having a reciprocable work supporting member, a multiple toothed cutter positioned to effect stock removal from work fed relative thereto by said member, an arbor support, a cutter arbor journaled in the support for supporting and rotating the cutter to effect successive engagement of the cutter teeth with the work whereby a periodic cutting force composed of a number of harmonics will be created, a vibration eliminator carried by the arbor, said eliminator including a vibrator, means to adjust the natural frequency of the vibrator into resonance with the frequency of the dominant harmonic of said cutting force, means to change the phase of the resultant motions of the vibrator and cutter whereby said vibrator will oppose movement of the arbor support, and damping means for causing said vibrator to resonate substantially in sympathy with other harmonics without changing the natural frequency of the vibrator.

10. In a machine tool having a rotating cutter and a work support, one of which is bodily movable relative to the other to effect a stock removal, the combination of independent elastic systems for supporting said parts in opposed relation to one another thereby creating a cutting force, means to eliminate vibration from the systems caused by variation in the cutting force including a tuned opposer, means to couple the opposer to one of said systems whereby vibration of the system at a given frequency will induce vibration in the opposer at the same frequency, and means in the opposer to adjust the motion phase of the induced frequency with respect to the given frequency whereby movement of the opposer will act in opposition to movement of the supporting system to dampen the amplitude thereof and thus dampen the amplitude of the opposing elastic system.

11. A vibration dampener for a supporting member of a machine tool comprising a fluid receiving reservoir formed in said member, one of the walls of said reservoir consisting of a flexible member, an inertia member attached to said wall whereby movement of the support will induce movement of said inertia member and flexure of the wall, a liquid filling the reservoir, an auxiliary reservoir, channel means connecting the main reservoir to the auxiliary reservoir, and a valve in said channel means for retarding flow between reservoirs and thereby dampen oscillatory energy of said supporting member.

12. A vibration dampener for a supporting member of a machine tool, comprising a fluid receiving reservoir formed in said member, one of the walls of said reservoir consisting of a flexible member, a vibrator attached to said wall whereby movement of the support will induce movement of the vibrator and flexure of the wall, an hydraulic fluid filling the reservoir, an auxiliary reservoir, channel means connecting the main reservoir with the auxiliary reservoir, a valve in said channel means for retarding flow between the reservoirs and thereby dampen oscillatory energy of said member, and means to adjust the valve to vary the amount of energy absorbed.

13. A vibration dampener for a machine tool including a main body member, said member having depressions formed in opposite sides, an intervening channel connecting the depressions, flexible cover plates attached to the member forming closures for the depressions, means to attach the plates to a machine tool part subject to vibration whereby said member will be free to move upon vibration of the part, and an hydraulic medium filling said depressions whereby vibration of the machine tool part will cause a flow through said channel and thereby a dampening of the oscillatory energy of said part.

14. A vibration dampener for a machine tool comprising a main body member, having depressions formed in the opposite sides thereof, circular flexible plates closing said depressions to form fluid receiving reservoirs, means to fix one portion of the plates to the member and another portion of the plates to the tool whereby the portions fixed to the tool will move therewith, an hydraulic medium interposed between the plates and the member for transmitting motion of one to the other, and means to vary the amount of hydraulic fluid in the reservoirs to vary the effect of said vibration dampener.

15. A vibration dampener for a machine tool support member comprising a main body member, said body member having depressions formed in opposite sides thereof, flexible plates closing said depressions to form fluid receiving reservoirs, means to fix the periphery of the plates to one member and the center of the plates to the other whereby the parts fixed to the support will move therewith, a fluid medium interposed between the plates and the member for transmitting motion of one to the other, means to vary the amount of fluid in the reservoirs to vary the phase relation between the support and the dampener, said fixed connection comprising a rod secured to the center of the plate, an adjustable sleeve mounted in the supporting member, and means to clamp the rod to the sleeve in the same axial position relative thereto in all positions of adjustment of the sleeve.

16. A vibration dampener for a machine tool support including a body member, depressions formed in the opposite sides of said members, flexible plates closing said depressions to form fluid receiving reservoirs, means secured to the center of said plates and fixed to the machine tool support whereby vibration of the support member will be transmitted to the center of said plates, openings for filling said reservoirs with fluid, a channel inter-connecting the depressions whereby, upon vibration of the support, fluid will flow from one reservoir to the other, and an adjustable member in said channel to regulate the amount of flow resistance and thereby the amount of oscillatory energy absorbed by the dampener.

17. A vibration dampener for a machine tool support including a body member, depressions formed in opposite sides of said member, flexible plates closing said depressions to form fluid receiving reservoirs, means secured to the center of said plates and fixed to the said support whereby vibration of the support will be transmitted to the center of said plates, means to fill the reservoirs with fluid, a channel inter-connecting the depressions whereby, upon vibration of the support, fluid will flow from one reservoir to the other, a variable resistance in said channel to regulate the resistance to flow and thereby the amount of oscillatory energy absorbed by the dampener, said resistance including a throttle valve and means for effecting adjustment of the valve during operation of the machine.

18. A vibration dampener comprising a main body member, circular depressions formed in opposite sides of said body, flexible plates closing said depressions to form fluid reservoirs, support rods secured to the center of said plates and projecting therefrom, sleeves adapted to be adjustably secured to a machine tool member, said sleeves receiving the support rods, means to adjust the sleeves into contact with the plates to maintain parallelism therebetween, and means to secure the rods to the sleeves after said adjustment, whereby said plates will be maintained equi-distant during vibration of the support.

19. In a milling machine having a column, a cutter spindle having a cutter thereon journaled in the column, an overarm carried by the column for supporting the outboard end of said spindle and a work support movable transversely of the spindle for feeding a work piece into engagement with the cutter, the combination of means for preventing vibration of the cutter including an inertia member suspended from the overarm, spaced fluid filled reservoirs in the member, a channel inter-connecting the reservoirs, an adjustable valve for varying the resistance to flow between reservoirs, supporting arms attached at one end to the inertia member, means attached to the overarm for gripping said arms at various effective lengths to vary the ratio of the impressed frequency to the natural frequency of the suspended structure and thereby the phase relation between the motion of the cutter spindle and the induced motion of the inertia member to oppose thereby the vibratory movement of the cutter supporting structure, and means automatically actuated by the vibration of the inertia member for inducing a flow between reservoirs to increase the amount of damping in the system whereby the inertia member will effectively respond to other induced frequencies without adjustment.

20. In a milling machine having a support, a cutter spindle having a cutter thereon journaled in the support, an overarm extending parallel to the spindle mounted on the support, and a work table movable transversely of the spindle for feeding work relative to the cutter, the combination of means for supporting the free end of the arbor and eliminating vibration therefrom including a pendant detachably mounted on the overarm, a bearing in the pendant for receiving the arbor, a vibration eliminator carried by the pendant, means to automatically connect the eliminator to the arbor upon assembly of the pendant with the overarm, means carried by the pendant for adjusting the phase relation between the vibratory motion of the arbor and the induced motion of the eliminator, and means to increase automatically the damping factor of the eliminator whereby the eliminator will effectively respond to other induced frequencies without attention on the part of the operator.

HANS ERNST.
MARIO E. MARTELLOTTI.